United States Patent
Eisen et al.

(10) Patent No.: US 10,862,889 B2
(45) Date of Patent: *Dec. 8, 2020

(54) METHODS AND SYSTEMS FOR PERSISTENT CROSS APPLICATION MOBILE DEVICE IDENTIFICATION

(71) Applicant: The 41st Parameter, Inc., Scottsdale, AZ (US)

(72) Inventors: Ori Eisen, Scottsdale, AZ (US); Raz Yalov, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,192

(22) Filed: Jun. 7, 2019

(65) Prior Publication Data
US 2019/0356659 A1 Nov. 21, 2019

Related U.S. Application Data

(63) Continuation of application No. 16/016,337, filed on Jun. 22, 2018, now Pat. No. 10,341,344, which is a
(Continued)

(51) Int. Cl.
*H04L 29/06* (2006.01)
*G06F 21/53* (2013.01)
(Continued)

(52) U.S. Cl.
CPC .......... *H04L 63/0876* (2013.01); *G06F 21/53* (2013.01); *G06F 21/73* (2013.01);
(Continued)

(58) Field of Classification Search
CPC . H04L 63/08; H04L 63/0428; H04L 63/0876; H04L 69/329; H04L 12/189;
(Continued)

(56) References Cited

U.S. PATENT DOCUMENTS 4,805,222 A 2/1989 Young et al.
4,912,761 A 3/1990 Tan et al.
(Continued)

FOREIGN PATENT DOCUMENTS

EP 0 418 144 3/1991
EP 0 645 692 3/1995
(Continued)

OTHER PUBLICATIONS

U.S. Appl. No. 13/831,085, U.S. Pat. No. 9,521,551, Methods and Systems for Persistent Cross-Application Mobile Device Identification, filed Mar. 14, 2013.
(Continued)

*Primary Examiner* — Margaret G Mastrodonato
(74) *Attorney, Agent, or Firm* — Knobbe, Martens, Olson & Bear, LLP

(57) ABSTRACT

Systems and methods are provided for persistent cross-application mobile device identification. A mobile device may have a plurality of sandboxes in memory containing applications. The mobile device may have a shared storage which may accessible by applications from different sandboxes. A storage location identifier may be used to access information in shared storage. A universal device identifier may be stored in the shared storage to identify the mobile device and may be accessible by multiple applications and updates to applications. The universal device identifier may be used to track the mobile device for advertising, fraud detection, reputation tracking, or other purposes.

20 Claims, 3 Drawing Sheets

Related U.S. Application Data continuation of application No. 15/358,848, filed on Nov. 22, 2016, now Pat. No. 10,021,099, which is a continuation of application No. 13/831,085, filed on Mar. 14, 2013, now Pat. No. 9,521,551.

(60) Provisional application No. 61/614,475, filed on Mar. 22, 2012.

(51) Int. Cl.
   *G06F 21/73* (2013.01)
   *H04W 12/06* (2009.01)
   *H04W 12/08* (2009.01)
   *G06F 21/31* (2013.01)

(52) U.S. Cl.
   CPC ... *H04W 12/0609* (2019.01); *H04W 12/0806* (2019.01); *G06F 21/31* (2013.01); *G06F 2221/2129* (2013.01); *G06F 2221/2149* (2013.01)

(58) Field of Classification Search
   CPC ... H04L 12/2602; H04L 67/10; H04L 67/306; H04L 67/327; H04L 67/22; H04L 41/0853; G06Q 20/12; G06Q 20/123; G06Q 20/32; G06Q 20/24; G06Q 20/40145; G06Q 20/322; G06Q 30/02; G06Q 30/0241; G06Q 30/0255; G06Q 30/0185; G06Q 30/0251; G06Q 30/0269; G06F 21/53; G06F 21/56; G06F 21/31; G06F 21/36; G06F 21/552; G06F 21/621873; H04W 12/12; H04W 12/06; H04W 12/08
   See application file for complete search history.

(56) References Cited

U.S. PATENT DOCUMENTS

| | | |
|---|---|---|
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |

(56) References Cited

U.S. PATENT DOCUMENTS

| | | |
|---|---|---|
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,778,846 B2 | 8/2010 | Suresh et al. |
| 7,813,937 B1 | 10/2010 | Pathria et al. |
| 7,813,944 B1 | 10/2010 | Luk et al. |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |

(56) References Cited

U.S. PATENT DOCUMENTS

| | | |
|---|---|---|
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,660,539 B2 | 2/2014 | Khambete et al. |
| 8,676,684 B2 | 3/2014 | Newman et al. |
| 8,683,561 B2 | 3/2014 | Utin |
| 8,688,543 B2 | 4/2014 | Dominguez |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,060,012 B2 | 6/2015 | Eisen |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,191,370 B2 | 11/2015 | Barber et al. |
| 9,196,004 B2 | 11/2015 | Eisen |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,514,248 B1 | 12/2016 | Guan et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,633,201 B1 | 4/2017 | Katz |
| 9,702,961 B2 | 7/2017 | Shields |
| 9,703,983 B2 | 7/2017 | Eisen et al. |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,948,629 B2 | 4/2018 | Eisen |
| 9,990,631 B2 | 6/2018 | Eisen |
| 10,021,099 B2 | 7/2018 | Eisen et al. |
| 10,089,679 B2 | 10/2018 | Eisen |
| 10,091,312 B1 | 10/2018 | Khanwalkar et al. |
| 10,339,306 B1 | 7/2019 | Katz |
| 10,341,344 B2 | 7/2019 | Eisen et al. |
| 10,395,252 B2 | 8/2019 | Eisen |
| 10,417,637 B2 | 9/2019 | Eisen |
| 10,453,066 B2 | 10/2019 | Eisen |
| 10,535,093 B2 | 1/2020 | Eisen |
| 10,616,201 B2 | 4/2020 | Eisen |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |

(56) References Cited

U.S. PATENT DOCUMENTS

| | | |
|---|---|---|
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0154676 A1 | 7/2005 | Ronning et al. |
| 2005/0185225 A1 | 8/2005 | Brawn et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0216278 A1 | 9/2005 | Eisen |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0234070 A1 | 10/2007 | Horning et al. |
| 2007/0234409 A1 | 10/2007 | Eisen |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0046562 A1 | 2/2008 | Butler |
| 2008/0052629 A1 | 2/2008 | Phillips et al. |
| 2008/0071682 A1 | 3/2008 | Dominguez |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0120195 A1 | 5/2008 | Shakkarwar |
| 2008/0120214 A1 | 5/2008 | Steele et al. |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0018940 A1 | 1/2009 | Wang et al. |
| 2009/0024971 A1 | 1/2009 | Willner et al. |
| 2009/0037213 A1 | 2/2009 | Eisen |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0070664 A1 | 3/2009 | Gavin et al. |
| 2009/0083184 A1 | 3/2009 | Eisen |
| 2009/0089869 A1 | 4/2009 | Varghese |
| 2009/0106413 A1 | 4/2009 | Salo |
| 2009/0138590 A1 | 5/2009 | Lee et al. |
| 2009/0157417 A1 | 6/2009 | Bradley et al. |
| 2009/0164269 A1 | 6/2009 | Gupta et al. |
| 2009/0177692 A1 | 7/2009 | Chagoly et al. |
| 2009/0183010 A1 | 7/2009 | Schnell et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0260064 A1 | 10/2009 | Mcdowell et al. |
| 2009/0265773 A1 | 10/2009 | Schultz |
| 2009/0271306 A1 | 10/2009 | Pierson |

(56) References Cited

U.S. PATENT DOCUMENTS

| | | |
|---|---|---|
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0070606 A1 | 3/2010 | Shenfield et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0321296 A1 | 12/2010 | Gross |
| 2010/0333170 A1 | 12/2010 | Cox et al. |
| 2011/0022483 A1 | 1/2011 | Hammad |
| 2011/0022517 A1 | 1/2011 | Hammad |
| 2011/0023115 A1 | 1/2011 | Wright |
| 2011/0035302 A1 | 2/2011 | Martell et al. |
| 2011/0047072 A1 | 2/2011 | Ciurea |
| 2011/0082768 A1 | 4/2011 | Eisen |
| 2011/0112901 A1 | 5/2011 | Fried et al. |
| 2011/0113388 A1 | 5/2011 | Eisen et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096557 A1 | 4/2012 | Britton et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0174223 A1 | 7/2012 | Eisen |
| 2012/0179558 A1 | 7/2012 | Fischer |
| 2012/0197981 A1 | 8/2012 | Chan |
| 2012/0204262 A1 | 8/2012 | Thomas et al. |
| 2012/0215896 A1 | 8/2012 | Johannsen |
| 2012/0216282 A1 | 8/2012 | Pappu et al. |
| 2012/0221470 A1 | 8/2012 | Lyon |
| 2012/0222111 A1 | 8/2012 | Oliver et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0278127 A1 | 11/2012 | Kirakosyan et al. |
| 2012/0295580 A1 | 11/2012 | Corner |
| 2012/0297380 A1 | 11/2012 | Colbert et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0330787 A1 | 12/2012 | Hanson et al. |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0144539 A1 | 6/2013 | Allen et al. |
| 2013/0148525 A1 | 6/2013 | Cuadra Sanchez et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0226717 A1 | 8/2013 | Ahluwalia et al. |
| 2013/0273879 A1 | 10/2013 | Eisen et al. |
| 2013/0339186 A1 | 12/2013 | French |
| 2014/0032902 A1 | 1/2014 | Agrawal et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0148197 A1 | 5/2014 | Shields |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0046989 A1 | 2/2015 | Oberheide et al. |
| 2015/0106270 A1 | 4/2015 | Burrell et al. |
| 2015/0127825 A1 | 5/2015 | Johannsen |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0221019 A1 | 8/2015 | Eisen |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |

(56) References Cited

U.S. PATENT DOCUMENTS

| | | |
|---|---|---|
| 2016/0019546 A1 | 1/2016 | Eisen |
| 2016/0021084 A1 | 1/2016 | Eisen |
| 2016/0034954 A1 | 2/2016 | Tollinger et al. |
| 2016/0125461 A1 | 5/2016 | Sivaramakrishnan et al. |
| 2016/0203487 A1 | 7/2016 | Eisen |
| 2016/0246581 A1 | 8/2016 | Jimenez et al. |
| 2016/0321701 A1 | 11/2016 | Artman et al. |
| 2016/0328710 A1 | 11/2016 | Britton et al. |
| 2017/0039571 A1 | 2/2017 | Eisen |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0066192 A1 | 2/2019 | Eisen |
| 2020/0005315 A1 | 1/2020 | Eisen |
| 2020/0013064 A1 | 1/2020 | Eisen |
| 2020/0034845 A1 | 1/2020 | Eisen |
| 2020/0092287 A1 | 3/2020 | Cano et al. |

FOREIGN PATENT DOCUMENTS

| | | |
|---|---|---|
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535124 | 8/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-048538 | 3/2009 |
| JP | 2009-122880 | 6/2009 |
| JP | 2009-175984 | 8/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159307 | 8/2011 |
| JP | 2012-234503 | 11/2012 |
| JP | 5191376 | 5/2013 |
| JP | 5216932 | 6/2013 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 99/050775 | 10/1999 |
| WO | WO 01/011450 | 2/2001 |
| WO | WO 01/033520 | 5/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 A2 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/142722 | 9/2013 |
| WO | WO 2014/022813 | 2/2014 |
| WO | WO 2014/078569 | 5/2014 |
| WO | WO 2018/129373 | 7/2018 |
| WO | WO 2018/151822 | 8/2018 |

OTHER PUBLICATIONS

U.S. Appl. No. 15/358,848, U.S. Pat. No. 10,021,099, Methods and Systems for Persistent Cross-Application Mobile Device Identification, filed Nov. 22, 2016.

U.S. Appl. No. 16/016,337, U.S. Pat. No. 10,341,344, Methods and Systems for Persistent Cross-Application Mobile Device Identification, filed Jun. 22, 2018.

Banking Services Newsletter, "Keeping You Up-to-Date on Banking Developments Throughout the UC System", University of California, Office of the President, Banking Services Group, Newsletter 1, Dec. 2005, p. 1.

Bharosa, "Bharosa Authenticator", http://www.bharosa.com/authenticator.html, Jan. 18, 2007, pp. 3.

Bharosa, "Bharosa Announces Online Authentication Solution to Counter Check 21-Based Fraud", http://www.bharosa.com/news/PR-110705.html, Jan. 18, 2007, pp. 2.

Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.

Derfler, Jr. et al, "How Networks Work", Millennium Edition, Que Corporation, Indianapolis, IN, Sep. 2000, pp. 230.

Gralla, Preston, "How the Internet Works", Millennium Edition, Que Corporation, Indianapolis, IN, Aug. 1999, pp. 329.

Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.

"ISO 8583", Wikipedia, http://en.wikipedia.org/wiki/ISO_8583, dated Apr. 13, 2015 in 14 pages.

Kohno et al., "Remote Physical Device Fingerprinting", Proceedings of 2005 IEEE Symposium on Security and Privacy, May 8-11, 2005, Oakland, CA, pp. 211-225.

Manavoglu et al., "Probabilistic User Behavior Models", ICDM, Third IEEE International Conference on Data Mining, Nov. 19-22, 2003, pp. 203-210.

TechWeb, "Wells Fargo Intros Anti-Theft Alerts", http://www.techweb.com/wire/166404177, Aug. 1, 2005, pp. 1.

(56) References Cited

OTHER PUBLICATIONS

"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Provisional Application as filed in U.S. Appl. No. 61/324,312, dated Apr. 15, 2010 in 15 pages.
Official Communication in European Patent Application No. 19181057.1, dated Sep. 17, 2019.
The Knightmare, "Secrets of a Super Hacker", Loompanics Unlimited, Port Townsend, Washington, 1994, pp. 233.
Official Communication in European Patent Application No. 19189189.4, dated Jan. 21, 2020.

METHODS AND SYSTEMS FOR PERSISTENT CROSS APPLICATION MOBILE DEVICE IDENTIFICATION

CROSS-REFERENCE

This application is a continuation application of U.S. application Ser. No. 16/016,337, filed on Jun. 22, 2018, entitled METHODS AND SYSTEMS FOR PERSISTENT CROSS-APPLICATION MOBILE DEVICE IDENTIFICATION, which is a continuation application of U.S. application Ser. No. 15/358,848, filed on Nov. 22, 2016, now U.S. Pat. No. 10,021,099, issued Jul. 10, 2018, entitled METHODS AND SYSTEMS FOR PERSISTENT CROSS-APPLICATION MOBILE DEVICE IDENTIFICATION, which is a continuation of U.S. application Ser. No. 13/831,085, filed Mar. 14, 2013, now U.S. Pat. No. 9,521,551, issued Dec. 13, 2016, entitled METHODS AND SYSTEMS FOR PERSISTENT CROSS-APPLICATION MOBILE DEVICE IDENTIFICATION, which claims the benefit of priority of U.S. Provisional Patent Application Ser. No. 61/614,475, filed Mar. 22, 2012, where all above-cited applications are hereby incorporated herein by reference in their entireties.

BACKGROUND OF THE INVENTION

As the use of networked mobiles devices grows, there is a general need for service providers and other third parties to be able to reliably and accurately track the usage patterns of a mobile device. For example, in connection with certain fraud detection methods, it is important to be able to identify the source device used to commit a fraudulent transaction in order to limit future potential fraudulent transactions from the same device. As another example, many advertising and marketing programs must accurately identify the mobile device from which various disparate activities and actions are taken.

Such systems and processes rely upon the ability to consistently and accurately identify the mobile device utilized for participating in such activities. Typically, in order to track various user activities, an application or a service provider may generate a service-specific identifier for each unique user of the application or service. The application will generally include such service-specific identifier along with each request from the mobile device made to the service in order for the service to accurately identify the originating user or mobile device.

The mobile device may be capable of storing and executing multiple applications on the same device, including applications that are developed by third parties. Such third parties may be untrusted or even unknown to the user of the mobile device, and the applications generated thereby may be capable of interfering with other applications executing on the mobile device. For this reason, some mobile device operating systems create a "sandbox" environment for each active application by which the memory, storage and other resources made available to one application are isolated from the memory, storage and resources made available to any other application.

Accordingly, if an application generates and stores a service-specific identifier on an iOS-enabled device, the identifier is stored in the application's "sandbox" environment and no other application on the iOS-enable device may access or use such identifier. As a result, the service-specific identifier is effective only for use by the specific service that generates it, but is not otherwise effective in uniquely identifying the mobile device itself. Further, each application on the mobile device is required to generate and store its own service-specific identifier, which will differ from the identifier utilized by every other application on the same mobile device. Accordingly, there is no reliable process or system for the mobile device itself to be accurately identified and tracked across a plurality of applications and users on the same mobile device.

Thus, a need exists to overcome the service-to-service or application-to-application variances in mobile device identification, and thereby provide a persistent cross-application mobile device identification process and system.

SUMMARY OF THE INVENTION

An aspect of the invention is directed to a method for identifying a mobile device, comprising: determining, with aid of a processor, whether a universal device identifier of the mobile device exists on the mobile device; generating the universal device identifier to identify the mobile device in response to a determination that the universal device identifier does not on the mobile device; storing the universal device identifier in a persistent shared storage on the mobile device; retrieving the universal device identifier from the persistent shared storage; and making available the identifier to a plurality of applications installed on the mobile device.

A system for identifying a mobile device may be provided in accordance with an aspect of the invention, said system comprising: a memory having (a) a plurality of application sandboxes, an individual sandbox having at least one application therein, and (b) a shared storage; and a processor capable of executing steps defined by the plurality of applications, wherein the applications are capable of accessing information within the shared storage via a storage location identifier, and the applications are not capable of accessing information from other sandboxes.

Another aspect of the invention is directed to a method of identifying a mobile device, comprising: providing a memory having (a) a plurality of application sandboxes, an individual sandbox having at least one application therein, and (b) a shared storage; providing a processor capable of executing steps defined by the plurality of applications; permitting the applications to access information within the shared storage via a storage location identifier, while not permitting the applications to access information from other sandboxes, wherein the information within the shared storage accessed by the applications includes a universal device identifier; and performing advertisement tracking of the mobile device using the universal device identifier.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for identifying mobile devices by a persistent cross-application identifier. Various aspects of the invention described herein may be applied to any of the particular applications set forth below. It shall be understood that different aspects of the invention can be appreciated individually, collectively, or in combination with each other.

It shall be understood that this invention is addressed to mobile device functionality. The mobile devices may include phones such as cellular phones, smartphones (e.g., iPhone, BlackBerry, Android, Treo); tablets (e.g., iPad, Galaxy Tab, Kindle Fire, Surface); a wireless device such as a wireless email device; certain network devices such a tablet; personal digital assistants (PDAs) such as a Palm-based device or Windows CE device; other devices capable of communicating wirelessly with a computer network or other communication network; or any other type of mobile device that may communicate over a network and handle electronic transactions. A mobile device may be handheld. A mobile device may use specialized programs or applications. Any discussion herein of devices may also be applied to any other mobile devices as provided.

Figure 1:
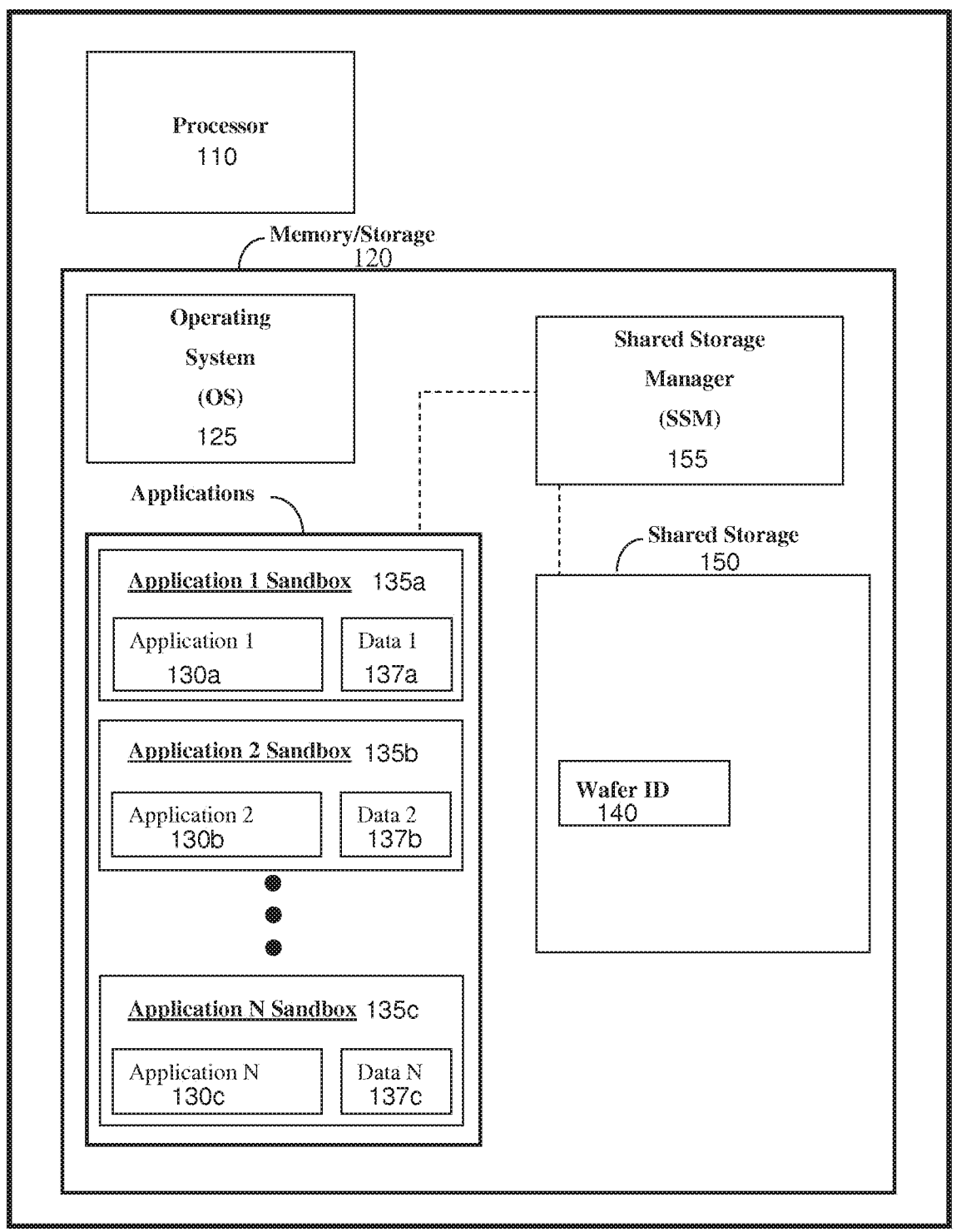
FIG. 1 illustrates a mobile device system for generating, storing, and using a persistent mobile device identifier that incorporates concepts of the invention.

As illustrated in FIG. 1, the mobile device 100 may have a processor 110 and a memory 120 that may store an operating system (OS) 125 and a plurality of applications or "apps" 130a, 130b, 130c. The memory may be capable of storing non-transitory computer readable media comprising code, logic, or instructions to perform one or more steps, such as steps of the apps. A processor may be capable of executing the one or more steps defined by the non-transitory computer readable media. The operating system may operate to display a graphical user interface to the user and permit the user to execute one or more apps. Any display known in the art may be used including, but not limited to, a liquid crystal display, a plasma screen, a touchscreen, an LED screen, or an OLED display. The processor may be capable of executing one or more steps of the methods provided herein to identify mobile devices by a persistent cross-application unique identifier. The applications may be native functionality incorporated into the OS of the mobile device or may be third party applications installed by the manufacturer, carrier network, or user of the mobile device.

It shall be understood that the memory of the mobile device may include non-removable memory or removable memory. The non-removable memory may consist of RAM, ROM, a hard disk, or other well-known memory storage technologies. The removable memory may consist of Subscriber Identity Module (SIM) cards, which are well known in GSM communication systems, or other well-known memory storage technologies, such as "smart cards." Applications could be installed and/or implemented in either the removable memory or the non-removable memory. Memory may include volatile and non-volatile memory. Volatile memory may include memory that requires power to retain information. Non-volatile memory may include memory that can retain information, even when it is not powered, such as include read-only memory, flash memory, ferroelectric RAM (F-RAM), most types of magnetic computer storage devices (e.g. hard disks, floppy disks, and magnetic tape), and/or optical discs.

It shall be understood that the mobiles devices may have one or more software applications (apps) 130a, 130b, 130c to carry out instructions. In some instances, one or more of the apps may generate an identifier 140 (e.g., device identifier, WaferID) and store a WaferID in shared storage 150. One or more steps of the application may be implemented by non-transitory and/or tangible computer readable media which may contain instructions, logic, data, or code that may be stored in persistent or temporary memory of the mobile device, or may somehow affect or initiate action by the computer or other device. In some embodiments, only some applications have instructions to generate, store or retrieve a device identifier from a shared storage. In some embodiments, all applications on the mobile device have instructions to generate, store or retrieve a device identifier from a shared storage.

As illustrated in FIG. 1, one or more of the applications installed on the mobile device may be restricted in its operations to a "sandbox" environment. A sandbox 135a, 135b 135c is a secure memory space on the mobile device in which such applications 130a, 130b, 130c are confined and prevented from accessing certain data 137a, 137b, 137c and resources. For example, some sandbox restrictions may prevent an application from accessing certain system resources and data such as critical system files. Applications may be capable of accessing data and resources within the same sandbox as the application. In some instances, applications are not capable of accessing data and resources in other sandboxes. Optionally, only one application is provided per sandbox. In other instances, multiple applications may be provided within the same sandbox if the applications are created, distributed, and/or operated by the same party. Alternatively, multiple applications may be provided within the same sandbox even they are not created, distributed and/or operated by the same party. As further example, some sandbox restrictions may prevent an application from accessing the data or resources created and used by another application on the same mobile device. For example, an application 130a in a first sandbox 135a may only be able to access data and resources 137a within the same sandbox, and may not be able to access data or resources 137b, 137c in other sandboxes 135b, 135c.

Confinement to a sandbox prevents applications from carrying out potentially dangerous or malicious operations on the mobile device. In some cases, the mobile device OS 125 may manage the sandbox and determine the resources that an application is prevented from accessing. For example, the Apple iOS operating system (used, for example, on Apple iPhone mobile phones, Apple iPad tablets and other mobile devices) isolates each application of the mobile device, including its respective data and preferences information, from other applications. The iOS operating system installs each application in its own application-specific storage directory and restricts the application from saving or accessing any application data that is stored external to the application-specific storage directory.

In accordance with the invention, as illustrated in FIG. 1, the mobile device may include a global, persistent shared storage 150 accessible by one or more applications 130a, 130b, 130c on the mobile device. In some instances, any of the applications may be able to access the shared storage, regardless of which sandbox within which they reside. The shared storage provides applications with data and information storage that is external to the application's sandbox environment on the mobile device. The shared storage may be implemented using removable or non-removable non-transitory memory on the mobile device. In some embodiments, the shared storage is made available to two or more applications on the same mobile device such that each of the applications may have permission to read data from and write data to the same memory location within the shared storage (i.e., "share" the memory). Accordingly, the shared storage provides a space for two or more applications to share data or information between the applications without violating the application's sandbox environment restriction on storing or accessing data from outside the application-specific storage directory.

The shared storage 150 may provide one or more of the following persistence characteristics for the information stored in the shared storage: (i) the information persists across a reboot or restart of the mobile device, (ii) the information persists across applications, (iii) the information persists across updated versions of applications, and/or (iv) the information persists across updated versions of the mobile device OS. It shall be understood that the shared storage may provide more than one of the persistence characteristics set forth above and may provide other persistence characteristics. The shared storage may be provided in non-volatile memory, such as ROM or any others described herein.

In accordance with the invention, the use of the shared storage 150 is controlled by a shared storage manager (SSM) 155. The SSM provides an interface and exposes the functionality necessary for applications, firmware or the mobile device OS 125 to interact with the shared storage. Accordingly, the SSM controls one or more applications' 130a, 130b, 130c access to the shared storage. In some embodiments, the mobile device OS may implement the SSM directly. For example, the Apple iOS system includes "pasteboard" functionality that can be used by applications to persistently store and share certain types of data for use by the application or between applications. In some embodiments, the SSM may restrict the types of information or data that may be stored in or retrieved from the shared storage. For example, the SSM may prevent executable code from being stored in the shared storage in order to restrict applications from performing potentially harmful activities that could interfere with the functionality of another application on the mobile device. As another example, the SSM may permit only text strings to be stored to and retrieved from the shared storage.

The SSM 155 provides access to specific information of the shared storage 150 by the use of a storage location identifier. One or more applications may retrieve shared data or information by requesting access from the SSM to the data or information at a specific shared storage location. In some embodiments, the storage location identifier may be an alphanumeric key that maps to a value located at a specific storage location and that identifies a specific piece of information. Any application may be able to access the information located at a specific storage location by use of the storage location identifier, regardless of the sandbox to which the application belongs. For example, an application (e.g., App 1) 130a may utilize the SSM to store application preferences data at the shared storage location identified by the key "Application I.Preferences" (which may function as the storage location identifier). Subsequently, a different application (e.g., App2) 130b may retrieve the preferences data of App1 by requesting from the SSM the data located at the shared storage location identified by the key "Application I.Preferences". Thus, applications may be able to access the same data or resources stored in a shared storage, via the storage location identifier, regardless of whether the applications are in the same or different sandboxes.

It shall be understood that the storage location identifier key may be any alphanumeric string and that each unique key shall map to a discrete piece of data or information stored in the shared storage. In some instances, the storage location identifier may have any other form that may uniquely identify or index the information in the shared storage.

Another aspect of the invention is directed to generating a persistent, universal device identifier (UDID) for a mobile device 100, referred to herein as a "WaferID" 140. Embodiments of the invention generate and maintain a WaferID for every mobile device. The WaferID uniquely identifies a mobile device in the context of an online service, a mobile device application, or other third party services. The WaferID is an identifier generated on the mobile device and can be separate from any system identifier that is pre-loaded by the mobile device OS, the mobile device manufacturer, or a network carrier. In some embodiments, only a single unique WaferID is generated for the mobile device. One or more applications and/or services may make use of the WaferID in identifying the device. In some embodiments, more than one WaferID may be generated for the mobile device such that a subset of applications and services on the mobile device can make use of the same WaferID in order to uniquely identify the mobile device.

The WaferID may be an alphanumeric string of any length and that is unique within the context of use for every mobile device. The WaferID may have any other form that may permit the unique identification of the mobile device. The WaferID is intended to be persistent and can typically survive a change in the carrier network, operating system, user and other variables associated with a mobile device. In some instances, the WaferID is only deleted upon request of a user or application. In some embodiments, the WaferID is generated by a process on the mobile device. It shall be understood that a variety of methods are known for generating an alphanumeric string that is unique for a mobile device. For example, the WaferID may be generated by any of a number of known algorithms for generating a random or pseudo-random string. In some embodiments, the algorithm may be seeded with a date or time to produce a unique WaferID.

The WaferID 140 for a mobile device may be stored in shared storage 150 of the mobile device. The WaferID may be a data or resource stored in the shared storage. The WaferID may be accessible via a storage location identifier. Thus, one or multiple applications may access the WaferID via the storage location identifier. This may occur if the applications are in the same sandbox, or in multiple sandboxes. Thus, multiple applications that may have been created, distributed, or operated by different applications may make use of the same WaferID, which may function as the device ID. This may be useful when multiple applications want to share information about the device.

Thus, one or more applications on the same mobile device may share the same WaferID through the use of the shared storage. In some embodiments, any application on the mobile device may request access to the WaferID associated with the mobile device. One or more applications of the same mobile device may share data in the shared storage of the mobile device, which may or may not be associated with the WaferID.

Figure 2:
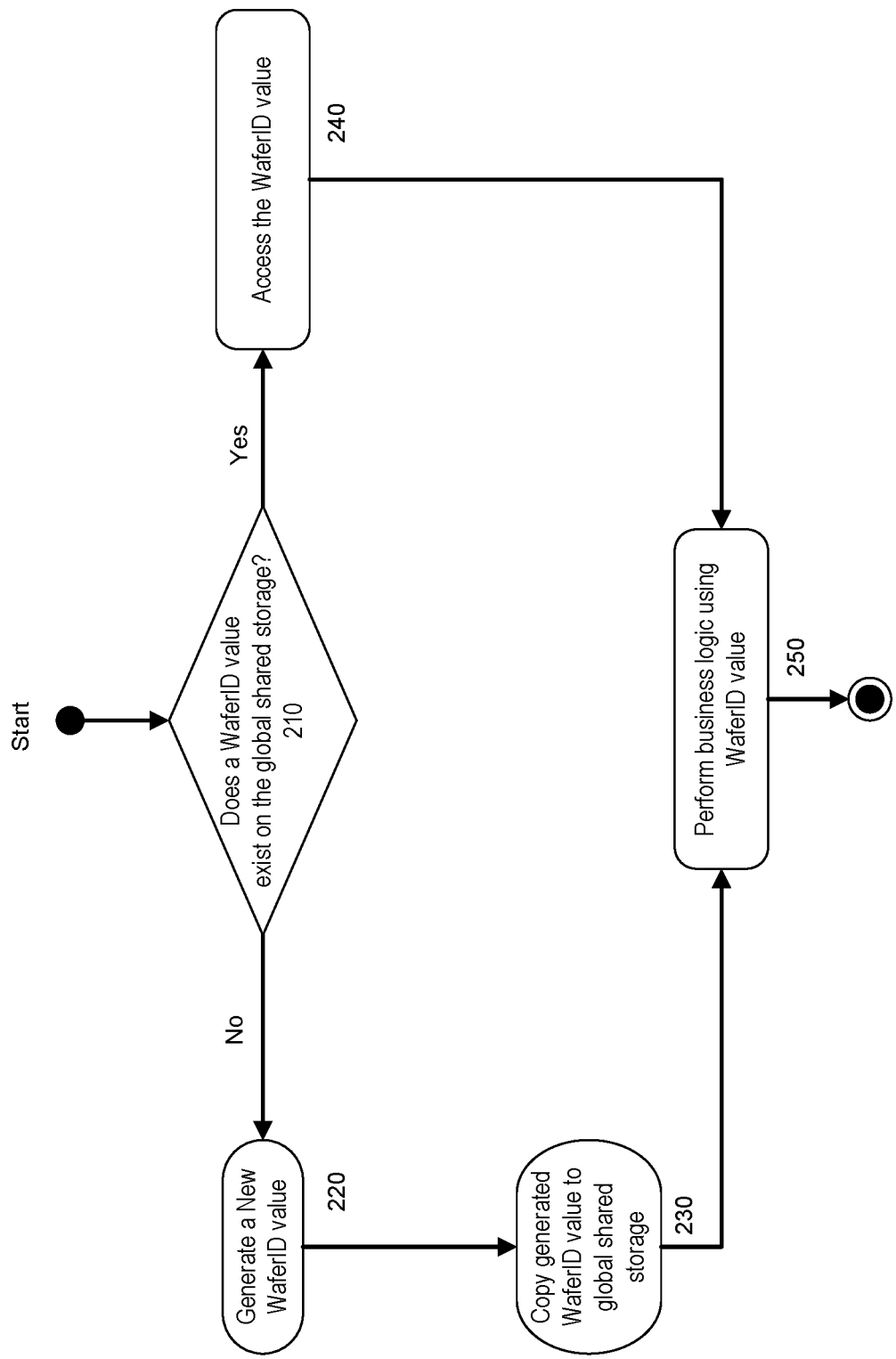
FIG. 2 illustrates a process for generating, storing, and using a persistent mobile device identifier that incorporates concepts of the invention.

FIG. 2 provides an example of a process for generating, storing, and using a persistent mobile device identifier (e.g., WaferID). An application of a mobile device may request access to a WaferID of the mobile device. A determination may be made whether a WaferID value exists in the shared storage 210. In some instances, a WaferID may be a universal device identifier (UDID), and a determination may be made whether a universal device identifier of a mobile device exists on the mobile device. As illustrated in FIG. 2, if no WaferID exists in the shared storage, a new WaferID is generated and associated with the mobile device 220. In some embodiments, the first application requesting a WaferID will trigger the generation of a new WaferID on the mobile device. In some embodiments, the WaferID may be generated by the mobile device OS automatically upon initialization of the mobile device for the first time. In some embodiments, the WaferID may be generated by a firmware process associated with a component of the mobile device.

As further illustrated in FIG. 2, the generated WaferID is stored in the shared storage. In accordance with the invention, the WaferID is stored the shared storage 230 using a storage location identifier known by the one or more applications that will share the WaferID. In some embodiments, the WaferID may be stored in a generally-known location, such as through the use of a well-advertised key as the storage location identifier. In some embodiments, the WaferID may be stored in shared storage using a non-obvious key as the storage location identifier, such as through the use of a key that is not publicly advertised. An application that knows the respective key may retrieve the WaferID from the shared storage location mapped to such key. In some instances, multiple applications may know the respective key, regardless of where in memory (e.g., which sandbox) the applications reside.

In some embodiments, the method and system disclosed herein may be associated with an application programming interface (API) or with a software development kit (SDK) that allows third parties to easily incorporate the functionality for generating, storing and using the WaferID. In other embodiments, the invention may be associated with the mobile device OS or with firmware associated with components of the mobile device.

If a WaferID already does exist in shared storage 240 the WaferID value is accessed. A storage location identifier may be used to access the WaferID.

As indicated in FIG. 2, the cross-application WaferID disclosed in this invention may be used in connection with business logic in order to identify a mobile device across applications, user contexts, and discrete user requests 250.

In some aspects of the invention, the WaferID may be used to maintain a record of activities connected to a specific mobile device. In one embodiment, the WaferID may be used for analytics purposes in connection with monitoring advertisement activities. It shall be understood that any known process in the art for providing in-application advertisements on a mobile device may be enhanced to use the WaferID. The use of the WaferID in connection with providing advertisements may allow an advertiser to understand usage patterns of the mobile device user across applications. For example, an advertiser may be able to track which advertisements are displayed to a specific mobile device regardless of which application is activated at the time the advertisement is displayed. The data from mobile device exposure to advertisements may be used to generate reports and for other analytics purposes.

In some embodiments, the WaferID may be used in connection with fraud detection and prevention methodologies. For example, a fraud detection and prevention system may identify a potential attacker or threat based on the WaferID associated with such attacker's device.

It may be advantageous for the WaferID to be accessible by multiple applications of a mobile device. For example, one or more entity may wish to share advertising or fraud information. In some instances, one or more applications may wish to access the same advertising or fraud information, regardless of whether they belong to the same entity or different entities. Reputational information may be carried across information. Reputational information may include bad reputation for a user or device (e.g., if likely involved in fraud), or good reputation for a user or device (e.g., if the user or device has a history without any problems). A persistent WaferID may permit multiple applications to access the unique device identifier, which may permit information about the device to be tracked across the different applications. Other data may be stored on the shared storage and be accessible by various applications. Such other data may or may not also be useful for advertisement, fraud, or reputation purposes.

Any of the steps described herein may occur with aid of a processor. The processor may be a processor of the mobile device.

Figure 3:
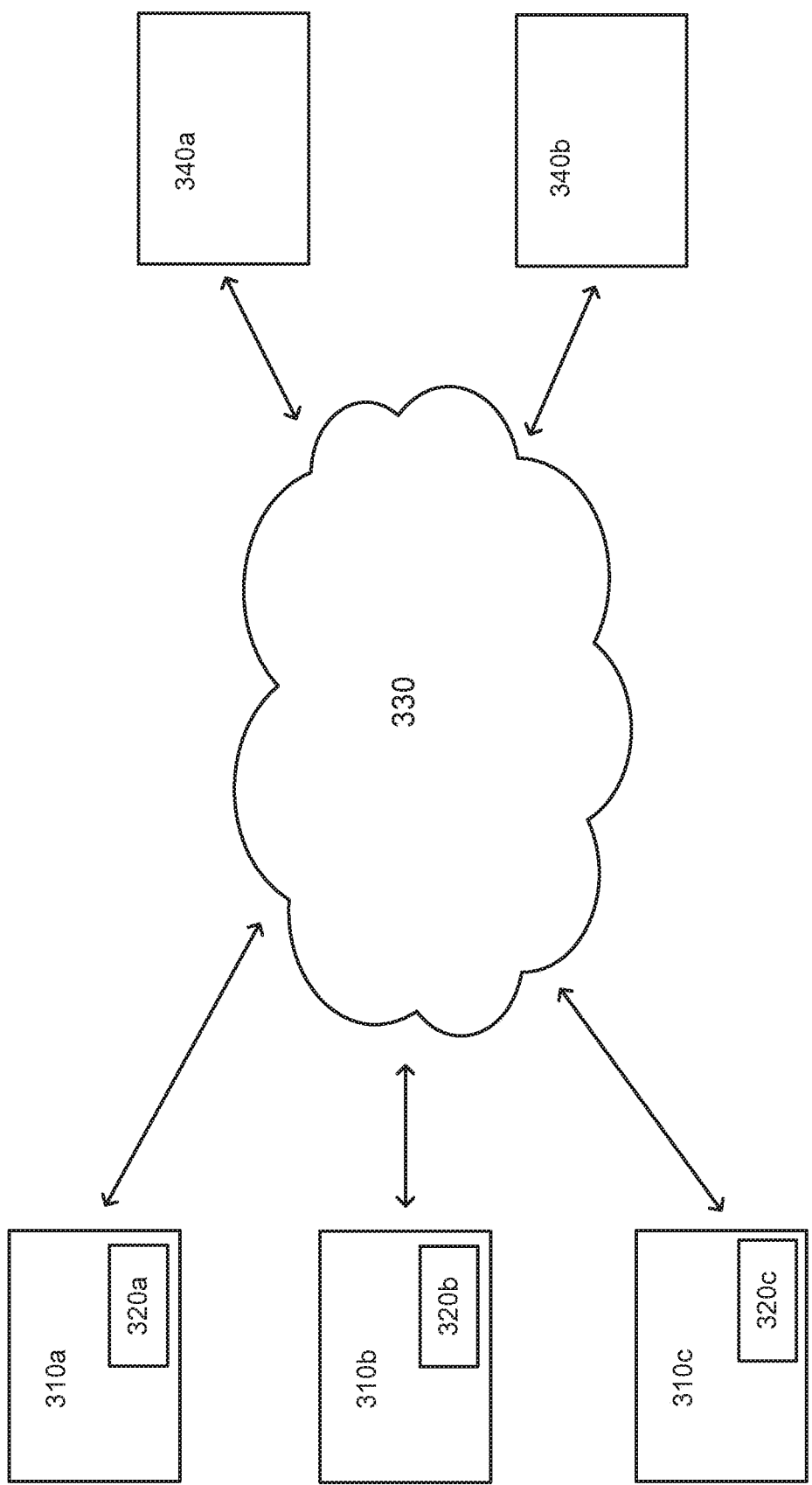
FIG. 3 shows an identification system utilizing persistent device identifiers in accordance with an embodiment of the invention.

FIG. 3 shows an identification system utilizing persistent device identifiers in accordance with an embodiment of the invention. One or more mobile devices 310a, 310b, 310c may be communicating over a network 330 with one or more server or storage device 340a, 340b. Any depiction of a single server may apply to multiple servers and/or databases. The servers and/or databases may be separate devices or may be integrated into a single device. The server and/or databases may belong to the same entity or different entities. The mobile devices may have one or more applications thereon, which may communicate with respective servers and/or databases.

An identification system may include a single device or a plurality of devices 310a, 310b, 310c. In some embodiments, a user may interact with a mobile device. In some instances a user of the system may interact with the system over a network. The user may utilize one or more applications on the mobile device. The user may download applications to the mobile device.

One or more devices 310a, 310b, 310c may be provided within the system. As previously described, a mobile device may have a display. The display may permit a visual display of information. The display may include a display of a browser and/or application. A viewable area of a canvas on the display may be a viewport. The display may be provided on a screen, such as an LCD screen, LED screen, OLED screen, CRT screen, plasma screen, touchscreen, e-ink screen or any other type of display device. The devices may also include displays of audio information. The display may show a user interface. A user of the system may interact with the device through a user interface. A user may interact via a user interactive device which may include but is not limited to a keypad, touchscreen, keyboard, mouse, trackball, touchpad, joystick, microphone, camera, motion sensor, IR sensor, heat sensor, electrical sensor, or any other user interactive device. A user may be able to operate and/or interact with an application via the display and/or user interactive device.

In some embodiments, a plurality of devices may be provided in a system. For example, two or more, 10 or more, 100 or more, 1,000 or more, 10,000 or more, 50,000 or more, 100,000 or more, 500,000 or more, 1,000,000 or more, 5,000,000 or more, 10,000,000 or more, 50,000,000 or more, 100,000,000 or more, or 1,000,000,000 or more devices may be provided. In some embodiments, a preselected group of devices may be provided. Devices may be accessing a software or application on one or more server 340a, 340b. Devices may be displaying a browser with content provided through the server. Devices may be capable of operating one or a plurality of applications simultaneously. Devices may be capable of interacting with servers for different entities simultaneously. Devices may be capable of interacting with external devices relating to different applications simultaneously.

The network 330 may be a local area network (LAN) or wide area network (WAN) such as the Internet. The network may be a personal area network, a telecommunications network such as a telephone network, cell phone network, mobile network, a wireless network, a data-providing network, or any other type of network. The communications may utilize wireless technology, such as Bluetooth or RTM technology. Alternatively, various communication methods may be utilized, such as a dial-up wired connection with a modem, a direct link such as TI, ISDN, or cable line. In some embodiments, a wireless connection may be using exemplary wireless networks such as cellular, satellite, or pager networks, GPRS, or a local data transport system such as Ethernet or token ring over a LAN. In some embodiments, the system may communicate wirelessly using infrared communication components.

One, two or more servers 340a, 340b may be provided in accordance with an embodiment of the invention. A server may include a memory and/or a processor. The server may or may not be at a location that is remote to the devices. The server may communicate with the devices over a network. In some instances, a cloud computing infrastructure may be provided. Any functions described herein may be carried out using a cloud computing infrastructure, such as distributed processing and memory functions. In alternate embodiments, peer to peer architectures may be utilized by the system.

The server may store data relating to a website or application to be displayed on a browser on a user's device. The server may store data or access data relating to an application. The server may be operated by a service that may aggregate and/or analyze information about one or more devices. A server may provide content to the devices via the network. The server may receive information about the devices. In some instances, two-way communication may be provided between the devices and the server.

The devices 310a, 310b, 310c may have corresponding universal device identifiers (UDIDs) 320a, 320b, 320c. In some embodiments, the universal device identifier for each device may be unique to that device. In some embodiments, universal device identifiers may be a unique string of numbers associated with a device that can let developers of apps track their apps. Or when passed between apps, UDIDs allm:v ad networks, for example, to build a profile noting user habits and preferences associated with that device, which allows them to more carefolly target their ads. A device may have a single universal device identifier. Alternatively, the device may have multiple universal device identifiers. The device identifiers may be accessible by one or more applications of the devices. The device identifiers may be accessible by multiple applications of the devices, even if the applications belong to different sandboxes.

When communicating with one or more server 340a, 340b that may relate to various applications of the devices, the universal device identifiers 320a, 320b, 320c of the devices 310a, 310b, 310c may be shared. The one or more server may track the universal device identifiers. The one or more servers may access databases and/or memory that may include information relating to the devices associated with the universal device identifiers. Such information may be accessed by servers associated with one or more applications of the device. For example, a first server 340a may relate to a first application of a device 310a and a second server 340b may relate to a second application of the device. A universal device identifier 320a of the device may be accessible by the first and second applications of the device. The universal device identifier may be conveyed to the related servers. In some instances, relevant information about the device to be accessed by the applications may be stored locally on the device. Alternatively, some or all of the information may be stored off-board (e.g., on the servers).

In some instances, one or more external devices, such as servers may access information relating to the universal device identifier. For example, external servers may have information stored about a mobile device based on its universal device identifier. In some instances, a plurality of servers related to different applications may have access to information about the mobile device based on its universal identifier. The plurality of servers may each keep their own records about the mobile device or may access the same data repository about the mobile device. The plurality of servers, which may relate to different applications, may share information about the mobile device, or may keep their own records about the mobile device. The servers may be operated by an entity that operates an application of the mobile device. Alternatively, they may be operated by different entities.

A universal device identifier may service as an index or key through which records about the mobile device may be accessed. This may be useful for keeping track of the mobile device for advertisement, fraud, and/or reputation purposes as described herein.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system for persistently identifying a mobile device across applications, the system comprising:
    a memory which comprises:
        a first sandbox associated with a first application;
        a second sandbox associated with a second application; and
        a persistent shared storage configured to store a universal device identifier; and
    a processor programmed to:
        execute the first application in the first sandbox, the first application restricted from accessing the second sandbox;
        execute the second application in the second sandbox, wherein the second application is restricted from accessing the first sandbox;
        receive a first request from the first application and a second request from the second application to access information associated with the mobile device, wherein the first request and the second request each comprises the universal device identifier;
        identify data associated with usage patterns of the mobile device across the first application and the second application;
        link the data associated with the usage patterns with the universal device identifier;
        store the data associated with the usage patterns in the persistent shared storage;
        in response to the first request and the second request, access the persistent shared storage and return a data packet comprising the data associated with the usage patterns of the mobile device to the first application and the second application.

2. The system of claim 1, wherein the universal device identifier is generated by the first application or the second application.

3. The system of claim 2, wherein the processor is further programmed to:
    obtain the universal device identifier from the first application or the second application; and
    store the universal device identifier in the persistent shared storage.

4. The system of claim 1, wherein the first request or the second request comprises a storage location identifier of the universal device identifier in the persistent shared storage.

5. The system of claim 1, wherein the processor is further programmed to:
    generate the universal device identifier on the mobile device in response to the first request; and
    communicate the universal device identifier generated in response to the first request to the second application in response to the second request.

6. The system of claim 1, wherein the universal device identifier is automatically generated by an operating system of the mobile device or by a firmware process associated with a component of the mobile device.

7. The system of claim 1, wherein the persistent shared storage stores information that persists across the first sandbox, the first application, the second sandbox, and the second application.

8. A computer-implemented method for persistently identifying a mobile device across applications, the computer-implemented method comprising:
    executing the first application in the first sandbox, the first application restricted from accessing the second sandbox;
    executing the second application in the second sandbox, the second application restricted from accessing the first sandbox;
    receiving a first request from the first application and a second request from the second application to access information associated with the mobile device, the first request and the second request each comprising the universal device identifier;
    identifying data associated with usage patterns of the mobile device across the first application and the second application;
    linking the data associated with the usage patterns with the universal device identifier;
    storing the data associated with the usage patterns in the persistent shared storage;
    in response to the first request and the second request, accessing the persistent shared storage and returning a data packet comprising the data associated with the usage patterns of the mobile device to the first application and the second application.

9. The computer-implemented method of claim 8, further comprising generating the universal device identifier using the first application or the second application.

10. The computer-implemented method of claim 9, further comprising:
    obtaining the universal device identifier from the first application or the second application; and
    storing the universal device identifier in the persistent shared storage.

11. The computer-implemented method of claim 8, wherein the first request or the second request comprising a storage location identifier of the universal device identifier in the persistent shared storage.

12. The computer-implemented method of claim 8, further comprising:
    generating the universal device identifier on the mobile device in response to the first request; and
    communicating the universal device identifier generated in response to the first request to the second application in response to the second request.

13. The computer-implemented method of claim 8, wherein the universal device identifier is automatically generated by an operating system of the mobile device or by a firmware process associated with a component of the mobile device.

14. The computer-implemented method of claim 8, wherein the persistent shared storage stores information that persists across the first sandbox, the first application, the second sandbox, and the second application.

15. A system for persistently identifying a mobile device across applications, the system comprising:
    a memory which comprises:
        a first sandbox associated with a first application;

a second sandbox associated with a second application; and a persistent shared storage; and a processor programmed to:

execute the first application in the first sandbox, the first application restricted from accessing the second sandbox;

execute the second application in the second sandbox, wherein the second application is restricted from accessing the first sandbox;

receive a first request from the first application and a second request from the second application to access information associated with the mobile device, wherein the second request comprises the universal device identifier;

retrieve the universal device identifier from the persistent shared storage; and return the universal device identifier and the information associated with the mobile device to the first application and the second application, in response to the first request and the second request.

16. The system of claim 15, wherein the universal device identifier is generated by the first application or the second application.

17. The system of claim 16, wherein the processor is further programmed to:

obtain the universal device identifier from the first application or the second application; and store the universal device identifier in the persistent shared storage.

18. The system of claim 15, wherein the first request or the second request comprises a storage location identifier of the universal device identifier in the persistent shared storage.

19. The system of claim 15, wherein the processor is further programmed to:

generate the universal device identifier on the mobile device in response to the first request; and communicate the universal device identifier generated in response to the first request to the second application in response to the second request.

20. The system of claim 15, wherein the universal device identifier is automatically generated by an operating system of the mobile device or by a firmware process associated with a component of the mobile device.

* * * * *